(12) United States Patent
Gort

(10) Patent No.: US 6,698,985 B2
(45) Date of Patent: Mar. 2, 2004

(54) SELF-LOCKING THREADED FASTENING ASSEMBLY

(75) Inventor: David William Gort, Rochdale (GB)

(73) Assignee: Bae Systems plc, Farnborough (GB)

( * ) Notice: Subject to any disclaimer, the term of this patent is extended or adjusted under 35 U.S.C. 154(b) by 0 days.

(21) Appl. No.: 10/181,767

(22) PCT Filed: Jan. 21, 2001

(86) PCT No.: PCT/GB01/00199

§ 371 (c)(1),
(2), (4) Date: Aug. 1, 2002

(87) PCT Pub. No.: WO01/53708

PCT Pub. Date: Jul. 26, 2001

(65) Prior Publication Data

US 2003/0059279 A1 Mar. 27, 2003

(30) Foreign Application Priority Data

Jan. 21, 2000 (GB) .............................. 0001296

(51) Int. Cl.[7] .......................... F16B 39/22; F16B 39/26; F16B 39/34

(52) U.S. Cl. ...................... 411/261; 411/290; 411/303; 411/935

(58) Field of Search ................................. 411/260, 261, 411/294, 299, 303, 533, 935, 290

(56) References Cited

U.S. PATENT DOCUMENTS

| 1,049,765 | A | * | 1/1913 | Reed | 411/261 |
|---|---|---|---|---|---|
| 2,430,884 | A | * | 11/1947 | Noyes | 411/261 X |
| 3,216,475 | A | * | 11/1965 | Jacobsen | 411/261 |
| 3,269,443 | A | | 8/1966 | Coyle | |
| 3,635,272 | A | | 1/1972 | Scheffer | |
| 3,638,980 | A | | 2/1972 | Kleinhenn | |
| 4,470,735 | A | | 9/1984 | Salisbury | |
| 5,393,183 | A | | 2/1995 | Hinton | |
| 6,132,153 | A | * | 10/2000 | LeVey et al. | 411/290 |

FOREIGN PATENT DOCUMENTS

| GB | 1006102 | 9/1965 |
|---|---|---|
| GB | 2340909 A | 3/2000 |
| SU | 706591 | 12/1979 |
| SU | 1196550 | 12/1985 |

* cited by examiner

*Primary Examiner*—Neill Wilson
(74) *Attorney, Agent, or Firm*—Nixon & Vanderhye P.C.

(57) ABSTRACT

A bolt with a partially threaded shank has a plurality of locking grooves located on the shank between the thread and its head. The bolt is inserted through a component stack and spacing washers and a stepped reaction washer such that at least half of the locking grooves are left exposed. A deformable frusto-conical locking ring is positioned on a nut having a circular receiving cavity on one end. The nut and locking ring are positioned on the thread of the bolt and tightened so that the locking ring is deformed from a frusto-conical shape to a substantially flat disc such that its bore diameter is reduced, thereby retaining it within one of the locking grooves. The outer diameter of the receiving cavity abuts the stepped reaction washer.

9 Claims, 1 Drawing Sheet

SELF-LOCKING THREADED FASTENING ASSEMBLY

This application is the US national phase of international application PCT/GB01/00199 filed Jan. 22, 2001, which designated the US.

BACKGROUND OF THE INVENTION

1. Field of the Invention

The present invention relates to a self-locking threaded fastening assembly.

2. Discussion of Prior Art

Conventional threaded fasteners may comprise a nut and a corresponding threaded portion on e.g a bolt or a threaded stud which can be used to fasten components. The nut may be locked on the bolt by means of a split pin. If further security is required, one earlier form of fastening includes a sprung locking ring provided on the bolt, which is permanently located in a groove between the thread and a plain portion of the shank of the bolt. On fitment, the split sprung ring depresses so that it sits flush with the shank diameter whilst the bolt is pushed through the bolthole until it appears on the opposite side. Once the bolt has been inserted, the split sprung ring opens out, preventing the bolt from being retracted through vibration or rotational mechanical actions. A nut is then fitted onto the bolt and where yet more security is required, e.g. for flying controls of an aircraft etc, a split pin would also be fitted. Even if the nut and split pin fail in service, the locking function exerted by the spring locking ring remains.

In practice the component stack may be too wide due to a build up of tolerances, resulting in a need for a bolt of alternative length. This replacement can be costly and time consuming as several components may need to be stripped down and rebuilt. Allowing for the difference in widths of component stack and length of the bolt can also have repercussions for other aspects of the design.

U.S. Pat. No. 5,393,183 shows an assembly having a captive nut and an internally threaded nut but is non-adjustable and requires various bolt lengths in order to satisfy various stack situations. U.S. Pat. No. 3,638,980 shows a self-retained bolt assembly but is also non-adjustable and ones of different sizes would have to be manufactured to deal with different size component stacks.

GB 2340909 discloses a nut and bolt locking system having a washer made of a resilient material. However, the spring lock can be manually pushed back to allow the nut to be removed, which means that it could come loose or be taken apart by unauthorised personnel. GB 1006102 discloses a locking device with a bolt having a helical thread, which can still result in similar problems to those described for the other known devices.

SUMMARY OF THE INVENTION

An object of the present invention is to provide an alternative form of self-locking fastening assembly, and preferably one which allows fixing of component stacks of variable width. In a preferred embodiment, the assembly and removal of the fixing means can be achieved using existing tools.

According to a first aspect of the present invention there is provided a self-locking fastening assembly including:

a male member having a shank, the shank including at one end region a helical threaded portion and further including a plurality of non-helical locking grooves located on the shank adjacent or inboard of the threaded portion;

a locking ring which in use is deformed on compression thereof so that its inner diameter contracts such that it can locate in and be retained by one or more of said locking grooves; and a nut for engaging said threaded portion and applying compression to said locking ring.

The provision of a plurality of locking grooves means that the locking device may be used with stacked components where the stack dimension varies, whilst still providing a good "tight" connection.

Preferably, the locking ring is of substantially dished or frusto-conical shape.

The fastening assembly may further include a reaction washer, the reaction washer being located in use on the shank adjacent the locking ring. The reaction washer is preferably at least partially tapered or frusto-conical in shape, and in use the inner diameter of the reaction washer preferably abuts the inner diameter of the locking ring.

Preferably, the nut has a receiving cavity at one end defined by an outer circumferential lip, the receiving cavity having such dimensions that the locking ring can be at least partially contained within it. Normally, when the fastening assembly is assembled, the outer diameter of the locking ring abuts the receiving cavity. In use, the lip of the receiving cavity preferably abuts the reaction washer, thereby allowing the clamping force exerted by the nut to be transmitted to the washer, and not just the locking ring, when the nut is tightened.

The fastening assembly may further include at least one spacing washer arranged in use inboard of the reaction washer.

The male member may be a bolt or a threaded stud.

Whilst the invention has been described above, it extends to any inventive combination of the features set out above or in the following description.

BRIEF DESCRIPTION OF THE DRAWINGS

The invention may be performed in various ways, and, by way of example only, an embodiment thereof will now be described by way of example only, reference being made to the accompanying drawings, in which.

DETAILED DISCUSSION OF EMBODIMENTS

The Figures illustrates a self-locking fastening in the form of a self-locking bolt.

Figure 1:
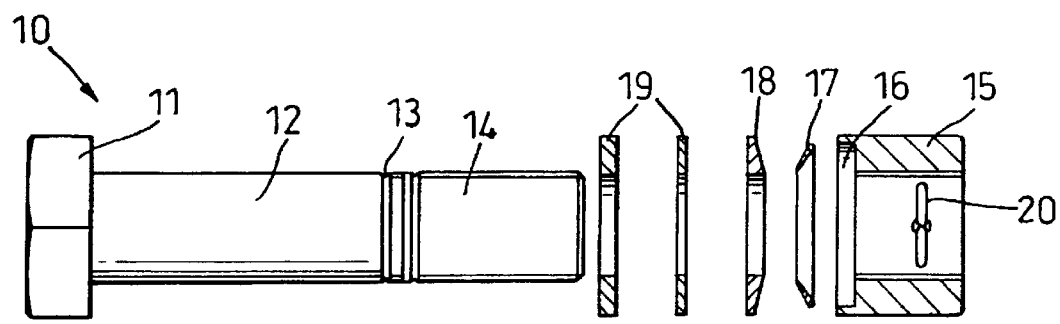
FIG. 1 illustrates the components of a preferred embodiment of a self-locking bolt assembly before being assembled.

In FIG. 1 a bolt 10 has a head 11 at one end with a cylindrical shank. A portion 12 of the shank adjacent to the head 11 has a substantially smooth, plain surface. A portion of the shank outboard of the plain portion 12 and remote from the head 11 includes a plurality of annular non-helical locking grooves 13. The locking grooves 13 are formed on the shank by using a threading tool, which may be a thread cutting or thread rolling tool, without any traverse for producing a helical pitch. As standard threading tools can be used, the bolt 10 may have an initially smooth shank, or a standard bolt having a helical thread can be adapted to include locking grooves. Thus, if no smooth shanked bolts of suitable size are available then standard bolts can be used.

A further portion of the shank, adjacent the locking grooves 13 and remote from the plain portion 12, includes a helical thread 14. The non-helical locking grooves 13 are similar in depth and shape to the thread 14, and thus the shear strength of the bolt is not reduced.

The assembly also includes a nut 15. The nut 15 has a threaded bore of diameter such that it can be threaded onto the thread 14 of the nut. One end of the nut 15 has a substantially circular receiving cavity 16 defined by an outer circumferential lip. The receiving cavity 16 is concentric with the bore of the nut 15.

The assembly also includes a locking ring 17. The locking ring 17 is substantially frusto-conical in shape and, before being fitted onto the bolt (as described below), has a usual diameter substantially equal to that of the shank of the bolt to allow it to be slid over the threaded portion 14. The locking ring may be manufactured from a variety of malleable or softer materials than the bolt 10 and nut 15. In the preferred embodiment the locking ring 17 is formed of Monel. In use, the various components will be assembled such that the outer diameter of the locking ring 17 abuts the receiving cavity 16 of the nut 15.

To the other side of the locking ring 17 from the nut 15 a reaction washer 18 faces the locking ring 17. The reaction washer 18 is an annular stepped washer having a frusto-conical surface facing the locking ring 17.

The fastening assembly can also include one or more washers 19. The washers 19 are selected by the assembler of the components as required, and may be of graded thickness to take up the clearance, e.g. 2.54 mm, 1.27 mm, etc.

Figure 2:
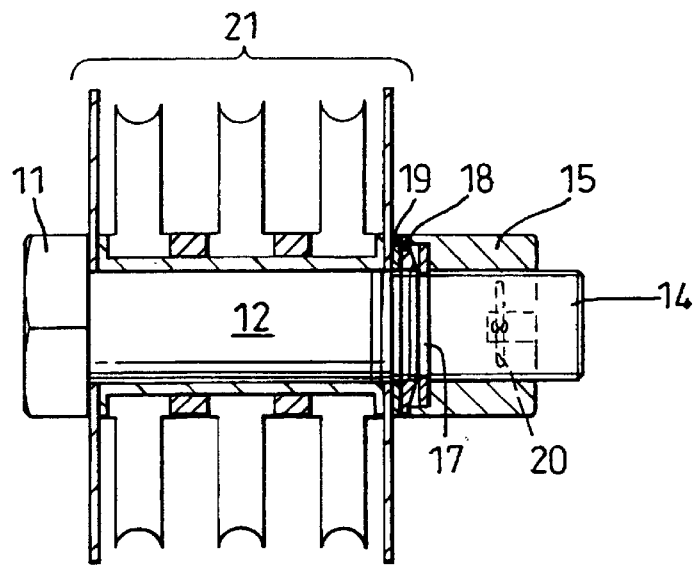
FIG. 2 illustrates the components of FIG. 1 in an assembled configuration fixing a component stack.

Referring now to FIG. 2, the self-locking bolt is shown clamping a stack 21 of components. To do this the bolt 10 is inserted through the component stack 21 such that the locking grooves 13 of the bolt protrude out through the component stack. The washers 19 and reaction washer 18 are then fitted onto the bolt, such that the washers 19 abut the component stack 21 and about half of the locking grooves 13 are left protruding. The locking ring 17 and the nut 15 is positioned on the free end of the bolt 10 and the nut are tightened by torque loading. The nut 15 is then locked in place using a split pin 20 in the usual manner.

Figure 3:
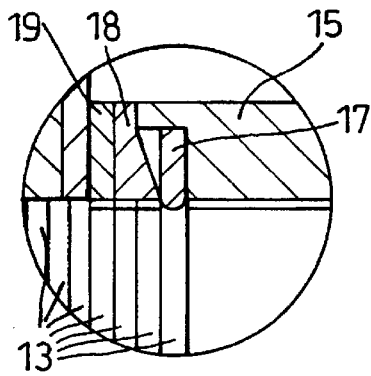
FIG. 3 illustrates a detailed view of portion A of FIG. 2.

As can be seen in FIG. 3, as the nut 15 is tightened to the correct torque, the frusto-conical surface of reaction washer 18 causes the frusto-conical locking ring 17 to be deformed to a substantially flat form, so that its bore diameter has been reduced, thereby causing it to be seated in one of the locking grooves 13. The lip of the receiving cavity abuts the outer edge of the reaction washer 18, with the frusto-conical portion of the reaction washer fitting inside the receiving cavity. This allows the clamping force to be transmitted from the nut via the reaction washer through the washers 19 and component stack 21 to the bolt head. This feature is also intended to prevent the locking ring 17 from being deformed beyond a flat shape.

Due to the presence of the plurality of locking grooves 13 on the bolt shank, it is possible to fit the bolts to assemblies of varying stack width, typically by up to 5 mm, thus reducing the delay in procuring an alternative bolt length or a costly strip down of the structure.

To remove the fastening assembly to allow the component stack to be disassembled, the nut 15 is unthreaded off the bolt 10 and the bolt is tapped until the locking ring 17 is free. This is similar to the manner in which a conventional self-locking bolt with a sprung locking ring is removed, and so the illustrated embodiment does not require any specialised equipment in order to be assembled and disassembled.

This fastening assembly may be used on many engineering products and can act as a "tamper proof" device to deter unauthorised strip downs. Also, on products which do not require more than two locking devices, the illustrated embodiment can be used on its own in those difficult places instead of split pins.

Thus, the preferred embodiment provides a secure locking mechanism which can be used in addition to conventional locking devices such as a nut and split pin. The availability of an additional locking mechanism is particularly useful in aircraft manufacture, as aviation authorities provide guidelines for the minimum number of locking devices which are to be used for certain components, e.g. for flying controls a minimum of three locking devices are stipulated, which could be implemented using a nut, a split pin and the locking ring of the preferred embodiment.

A fourth locking mechanism could be added by using a lock nut, which may be of the nylon or compressed thread type (i.e. one in which on tightening the thread in the nut is compressed) instead of a standard nut, thus giving four locking devices: the nut, the compressed thread within the nut, the split pin and the locking ring of the preferred embodiment. In other cases, the designer or engineer may stipulate two locking devices, which would conventionally be implemented by means of a nut and a split pin. However, where sufficient space is unavailable or access is difficult, the split pin may be replaced by a locking nut or the locking ring of the preferred embodiment which provides a substantially tamper-proof locking arrangement.

What is claimed is:

1. A self-locking fastening assembly including:
   a male member having a shank including at one end region a helical threaded portion and further including a plurality of non-helical locking grooves located on the shank adjacent or inboard of the threaded portion;
   a locking ring deformable upon compression thereof so that its inner diameter contracts such that it can be located in and retained by at least one of said locking grooves, and
   a nut for threadably engaging said threaded portion and applying compression to said locking ring.

2. A self-locking fastening assembly according to claim 1, wherein the locking ring is of substantially dished or frusto-conical shape.

3. A self-locking fastening assembly according to claim 1, wherein the nut has a receiving cavity at one end defined by an outer circumferential lip, the receiving cavity having such dimensions that the locking ring can be at least partially contained within it.

4. A self-locking fastening assembly according to claim 1, wherein the male member is a bolt.

5. A self-locking fastening assembly according to claim 1, wherein the male member is a threaded stud.

6. A self-locking fastening assembly according to claim 1, further including a reaction washer, the reaction washer being located in use on the shank adjacent to the locking ring.

7. A self-locking fastening assembly according to claim 6, wherein the reaction washer is at least partially tapered or frusto-conical in shape.

8. A self-locking fastening assembly according to claim 6, where in use the lip of the receiving cavity abuts the reaction washer.

9. A self-locking fastening assembly according to claim 6, further including at least one spacing washer, the spacing washer being located in use adjacent the reaction washer.

* * * * *